(12) United States Patent
Huseth et al.

(10) Patent No.: US 7,756,415 B2
(45) Date of Patent: Jul. 13, 2010

(54) METHOD AND SYSTEM FOR AUTOMATICALLY ESTIMATING THE SPATIAL POSITIONS OF CAMERAS IN A CAMERA NETWORK

(75) Inventors: Steve D. Huseth, Plymouth, MN (US); Soumitri N. Kolavennu, Minneapolis, MN (US); Saad J. Bedros, West St. Paul, MN (US); Isaac Cohen, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 741 days.

(21) Appl. No.: 11/599,246

(22) Filed: Nov. 13, 2006

(65) Prior Publication Data

US 2008/0112699 A1 May 15, 2008

(51) Int. Cl.
*G03B 17/48* (2006.01)
*H04N 7/18* (2006.01)
*G08B 13/14* (2006.01)
*G01S 3/02* (2006.01)

(52) U.S. Cl. .................... 396/429; 348/143; 340/572.1; 342/463

(58) Field of Classification Search ................... 396/89
See application file for complete search history.

(56) References Cited

U.S. PATENT DOCUMENTS

| | | | |
|---|---|---|---|
| 5,164,827 A * | 11/1992 | Paff | 348/143 |
| 5,995,763 A | 11/1999 | Posa et al. | |
| 6,167,295 A | 12/2000 | Cosman | 600/426 |
| 6,173,119 B1 * | 1/2001 | Manico et al. | 396/6 |
| 6,219,099 B1 | 4/2001 | Johnson et al. | 348/383 |
| 6,750,902 B1 | 6/2004 | Steinberg et al. | 348/211.3 |
| 6,873,353 B1 | 3/2005 | Valkonen et al. | 348/88 |
| 7,089,019 B2 * | 8/2006 | Ormson | 455/456.1 |
| 2003/0040815 A1 | 2/2003 | Pavlidis | 700/48 |
| 2003/0218540 A1 * | 11/2003 | Cooper et al. | 340/539.26 |
| 2004/0078151 A1 * | 4/2004 | Aljadeff et al. | 702/40 |
| 2004/0169587 A1 | 9/2004 | Washington | |
| 2004/0263609 A1 | 12/2004 | Otsuki et al. | 348/14.02 |

(Continued)

OTHER PUBLICATIONS

JP 2003-289532, Machine English Translation, 23 pages, Japanese Application Published Oct. 10, 2003.*

(Continued)

*Primary Examiner*—Melissa J Koval
(74) *Attorney, Agent, or Firm*—Matthew F. Lambrinos; Kermit D. Lopez; Kris T. Fredrick

(57) ABSTRACT

A method for automatically estimating the spatial positions between cameras in a camera network utilizes unique identifying signals, such as RFID signals, transmitting between nearby cameras to estimate the relative distances or positions between cameras from received signal strength (RSS), time of arrival (TOA), or time difference of arrival (TDOA) measurements to thereby determine the neighboring relationship among the cameras. A discover-locate process can be used to discover, from the estimated relative distances, unknown cameras in the vicinity of at least three cameras at known locations. Absolute locations of the discovered unknown cameras can then be calculated using a geometric calculation. The discover-locate process can be cascaded throughout the network to discover and locate all unknown cameras automatically using previously discovered and located cameras. Such methods can be implemented in systems having cameras with transceivers integrated therein and a controller operably linked to the cameras.

16 Claims, 8 Drawing Sheets

U.S. PATENT DOCUMENTS

| | | | |
|---|---|---|---|
| 2005/0270375 A1 | 12/2005 | Poulin et al. | 348/187 |
| 2006/0071790 A1* | 4/2006 | Duron et al. | 340/572.1 |
| 2006/0107296 A1 | 5/2006 | Mock et al. | |
| 2007/0139199 A1* | 6/2007 | Hanlon | 340/572.1 |
| 2007/0290830 A1* | 12/2007 | Gurley | 340/506 |
| 2008/0246613 A1* | 10/2008 | Linstrom et al. | 340/572.4 |
| 2008/0291278 A1* | 11/2008 | Zhang et al. | 348/159 |
| 2009/0134968 A1* | 5/2009 | Girgensohn et al. | 340/3.1 |

OTHER PUBLICATIONS

PCT—Notification of Transmittal of the International Search Report and The Written Opinion of the International Searching Authority, or the Declaration, Date of Mailing May 23, 2008.

Eseries Camera Range, Ademco Video, 2 pages, 2" Color Dome Camera, Ademco Video, 2 pages, Mar. 2002, Digital Video Integrator (R160), Specification Data, Honeywell International Inc., 13 pages, Mar. 2003, Honeywell Digital Video Manager, Honeywell International Inc., 4 pages, Jun. 2005.

* cited by examiner

METHOD AND SYSTEM FOR AUTOMATICALLY ESTIMATING THE SPATIAL POSITIONS OF CAMERAS IN A CAMERA NETWORK

TECHNICAL FIELD

Embodiments relate to methods and systems for configuring device networks and, more particularly, to systems and methods for automatically estimating the spatial positions of cameras in a camera network, such as a network of a video based camera system. Additionally, embodiments relate to systems and methods for automatically estimating relative and/or absolute locations of cameras in camera networks. Also, embodiments relate to techniques for determining which cameras are positioned in the physical vicinity of an event of interest.

BACKGROUND

Advances in digital video camera technology have resulted in high quality cameras with lower cost and greater image resolution. This has permitted facility owners to deploy an increasing number of cameras that must be monitored by a fixed size security staff. Critical to making the existing staff as productive as possible is to provide additional information on which cameras have the most important information. When an event of interest occurs, being able to easily select cameras in the same physical vicinity as the event of interest will allow security personal to better assess the event and take the appropriate action. However, maintaining location information in large camera systems is difficult and expensive requiring an additional step by the installer to correctly annotate the camera's position.

Furthermore, cameras are frequently moved or added incrementally causing the information to be incorrect or non-existent. Cameras can become "lost" where they may be functioning but a repair person servicing the camera will require extra time to find the exact location of the camera requiring attention.

The embodiments disclosed herein therefore directly address the shortcomings of known camera networks by providing a system and method for automatically estimating the spatial positions of cameras in the camera network.

BRIEF SUMMARY

It is therefore one aspect of the embodiments to provide for a method for automatically estimating the spatial positions of cameras in a camera network.

It is therefore another aspect of the embodiments to provide for a system for automatically estimating the spatial positions of cameras in a network.

It is therefore yet another aspect of the embodiments to provide for a method and system for automatically estimating the absolute and/or relative location of a lost camera in a camera network.

The aforementioned aspects and other objectives and advantages can now be achieved as described herein.

In one aspect, a method for automatically estimating the spatial positions between cameras in a camera network comprises transmitting unique identifying signals, such as RF identifying signals, infra-red identifying signals or other electromagnetic signals or ultrasonic identifying signals, between a plurality of spatially separated nearby cameras; measuring the received signal strength (RSS), time of arrival (TOA), or time difference of arrival (TDOA) of the identifying signals; and estimating the relative distances or positions between at least some cameras from the received signal strength (RSS), time of arrival (TOA), or time difference of arrival (TDOA) measurements to thereby determine the neighboring relationship among the at least some cameras.

Transmitting identifying signals between the cameras and estimating their relative distances from measured RSS, TOA of TDOA measurements enables the camera network to automatically self configure the relative spatial positions of the cameras thereby reducing the amount of camera network information which an installer must provide to set up the camera network.

The method can further comprise estimating the absolute location of at least one unknown camera from estimations of the relative distances between the at least one unknown camera and at least three cameras at known absolute locations and the known absolute locations thereof using a geometry based calculation, such as a multilateration calculation. Preferably, the method further comprises estimating the absolute location of at least one unknown camera using a discover-locate process comprising discovering the at least one unknown camera in the vicinity of at least three cameras at absolute known locations based on the estimated relative distances between the unknown camera and the at least three cameras; and estimating the absolute location of the discovered at least one unknown camera from estimations of the relative distances between the at least one unknown camera and the at least three cameras and the known locations thereof using the geometry based calculation.

Furthermore, the method can further comprise estimating the relative distances or positions of each camera from each other camera from the received signal strength (RSS), time of arrival (TOA), or time difference of arrival (TDOA) measurements to thereby determine the neighboring relationship among cameras throughout the camera network; and estimating the absolute location of unknown cameras throughout the network by cascading the discover-locate process throughout the camera network.

Estimating the absolute locations of the unknown cameras by cascading the discover—locate process throughout the camera network enables the location of all unknown cameras to be estimated from a small number of cameras in known locations so that the camera network can be quickly and easily installed without having to manually measure the position of all the cameras and/or input all the absolute locations of the cameras into the camera system.

Cascading the discover-locate process can comprise repeating again and again both the steps of discovering the at least one unknown camera and estimating the absolute location thereof using at least one previously discovered and located camera as a camera at a known location for the purpose of discovering and locating other unknown cameras until all cameras at unknown locations throughout the camera network are discovered and the absolute locations thereof have been estimated.

The method can also further comprise annotating the absolute locations of the cameras on a plan or map of the environment in which the camera network is installed. Also, the method can comprise determining at least one camera in the proximity of an event of interest detected by a sensor by comparing the estimated absolute locations of the cameras to the predetermined absolute location of the sensor.

According to another aspect, a method for automatically estimating the spatial positions between cameras in a camera network comprises transmitting unique radio frequency identifying (RFID) signals between a plurality of spatially separated cameras; measuring the received signal strength (RSS), time of arrival (TOA), or time difference of arrival (TDOA) of the RFID signals; and estimating the relative distances or positions between each camera and each other camera from the received signal strength (RSS), time of arrival (TOA), or time difference of arrival (TDOA) measurements to thereby determine the neighboring relationship among cameras in a camera network.

The method can estimate the absolute location of unknown cameras throughout the network using a cascading discover-locate process which comprises discovering at least one unknown camera in the vicinity of at least three cameras at absolute known locations based on the estimated relative distances between the unknown camera and the at least three cameras; estimating the absolute location of the discovered at least one unknown camera from estimations of the relative distances between the discovered at least one unknown camera and the at least three cameras and the known locations thereof using a geometry based calculation, such as a multilateration calculation; and repeating the steps of discovering the at least one unknown camera and estimating the absolute location thereof using at least one previously discovered and located camera as a camera at a known absolute location for the purpose of estimating the absolute location of other unknown cameras until all cameras at unknown locations are discovered and the absolute locations thereof have been estimated. The method can also include annotating the discovered absolute location of the unknown cameras on a plan or map representing an environment in which the camera network is installed.

The step of estimating the relative distances from the received signal strength measurements can comprise measuring the received signal strengths of the RFID signals; and correlating the measured signal strengths to predetermined strength-to-distance measurements for RFID signals transmitted at substantially the same signal strength as the RFID signals.

The method can yet further comprise estimating the absolute location of at least one functioning lost camera from estimations of the relative distances among the at least one unknown camera and at least three cameras at known positions and the known locations of the least there cameras using a geometry based calculation.

According to yet another aspect, a system for estimating the spatial positions of cameras in a camera network has a plurality of spatially separated cameras carrying transceivers adapted and arranged to transmit unique identifying signals between nearby cameras. A controller, operably linked to the transceivers, is adapted and arranged to estimate the relative positions or distances between at least some cameras from the received signal strength (RSS), time of arrival (TOA), or time difference of arrival (TDOA) of the RFID signals to thereby determine the neighboring relationship among the at least some cameras.

The controller can be configured to discover the at least one unknown camera in the vicinity of at least three cameras at absolute known locations based on the estimated relative distances between the unknown camera and the at least three cameras. The controller can be further configured to estimate the absolute location of the at least one unknown camera from estimations of the relative distances between the at least one unknown camera and the at least three cameras and the known locations thereof using a geometry based calculation such as multilateration.

The controller can be configured to repeatedly discover another at least one unknown camera and estimate the absolute location thereof using at least one previously discovered and located camera as a camera at a known location for the purpose of discovering and locating the another at least one camera until all cameras at unknown locations are discovered and the absolute locations thereof have been estimated.

Also, a graphical user interface can be operably linked to the controller. The controller can be adapted and arranged to render the estimated locations of the cameras on a plan or map of an environment displayed on the graphical user interface.

The controller can also be adapted and arranged to identify at least one camera in the proximity of an event of interest detected by a sensor by comparing the absolute locations of the cameras to a predetermined absolute location of the sensor.

BRIEF DESCRIPTION OF THE DRAWINGS

The accompanying figures, in which like reference numerals refer to identical or functionally similar elements throughout the separate views and which are incorporated in and form a part of the specification, further illustrate the embodiment, together with the background, brief summary, and detailed description, serve to explain the principles of the illustrative embodiment.

DETAILED DESCRIPTION

The method and system for estimating the spatial positions of cameras in a camera network of the illustrative embodiments provides an approach to allow cameras to automatically estimate the distance between each other both inside and outside of a building where GPS service is not available. Furthermore, the method and system of the embodiments also provide an approach to enable self configuration of the camera network by automatically estimating the absolute locations of unknown cameras throughout the camera network. Using this approach, lost cameras can also be easily located and repaired. Also, a camera in the same vicinity of an event of interest can easily be discovered from the estimated locations of the cameras and the known location of the event of interest.

Figure 1:
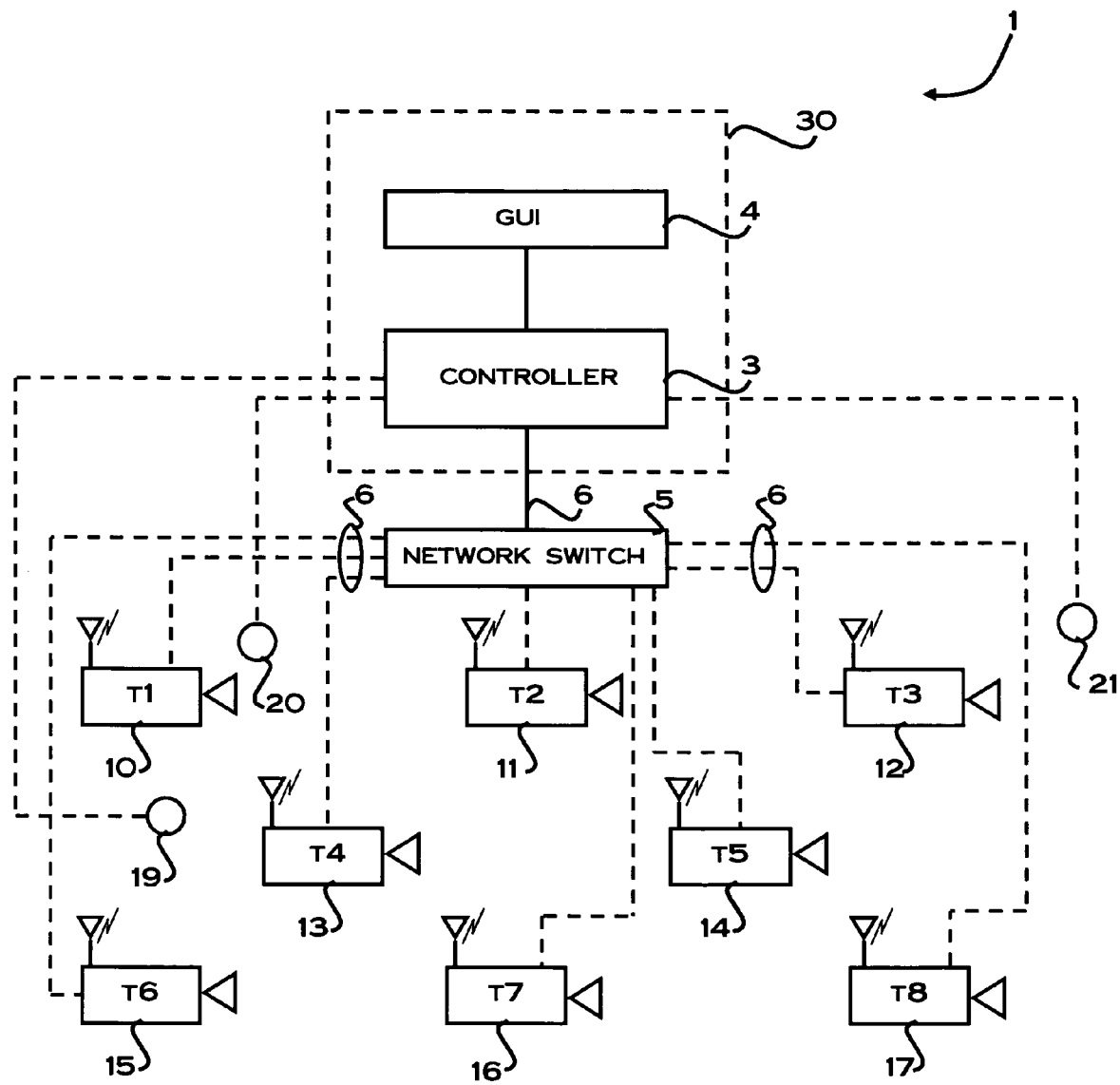
FIG. 1 illustrates a schematic of a system for estimating the spatial positions of cameras in a video camera network according to a preferred embodiment.

In order to explain the method for estimating the spatial position of cameras in a camera network according to the illustrative embodiment, reference will first be made to a suitable system for implementing the method. As indicated in FIG. 1 of the accompanying drawings, system 1 has a plurality of spatially separated cameras 10-17 incorporating respective transceivers T1-T8 which are each configured to transmit unique identifying signals to nearby cameras. A controller 3 is operably linked to cameras 10-17 via network links 6 and is adapted and arranged to estimate the relative positions or distances between one or more cameras based on the received signal strength (RSS) of the identifying signals to thereby determine the neighboring relationship among some or all of the cameras in the camera network.

In the system of the illustrative embodiment shown in FIG. 1, controller 3 is integrated in a video control and management system 30, such as the Digital Video Manager System of Honeywell International Inc. 101 Columbia Road, Morristown, N.J. 07962, USA, which is operable on one or more PCs or servers, and configured to control and manage camera functions, such as camera recording and live viewing. The video control and management system 30 includes algorithms, which when run on the management system, cause the system to control the cameras' direction, selection, and video recording. Alternatively, controller 3 can be independently linked to the cameras and/or operate independently of the video control and management system and can be implemented for example on a dedicated microcontroller such as an ASIC, or other type of processor.

Camera location information is typically annotated on a facility map which is rendered on a display via a graphical user interface 4 of the video management system 30. The facility map (not shown) is a pictorial representation of the environment in which the cameras of the network are deployed.

Also in the illustrative embodiment, cameras 10-17 are closed circuit digital television camera, such as for example Ademco video e-series or AD2FC1(X) in door security cameras from Honeywell International Inc. 101 Columbia Road, Morristown, N.J. 07962, USA. However, any type of camera which is suitable for use in a camera network can be used. Network links 6 back to the controller 3 may be either hardwired or wireless where the data is passed from camera to camera through a wireless mesh network. Links 6 and network switch 5 can for example be implemented as a TCP/IP network over the Ethernet. Alternatively, cameras can be operably linked to the controller 3 by other methods known in the art.

The controller 3 can also be operably linked to a plurality of sensors 19-21 deployed at predetermined locations for sensing events of interest in the proximity of the sensors. For example, if the camera network is installed inside a building, the sensors may be for example emergency smoke or gas detectors for sensing fires and other hazardous conditions in the building or security sensors for sensing the opening or closing of the building windows or doors. The position coordinates of the sensors 19-21 are predetermined and available to the controller 30.

Figure 2:
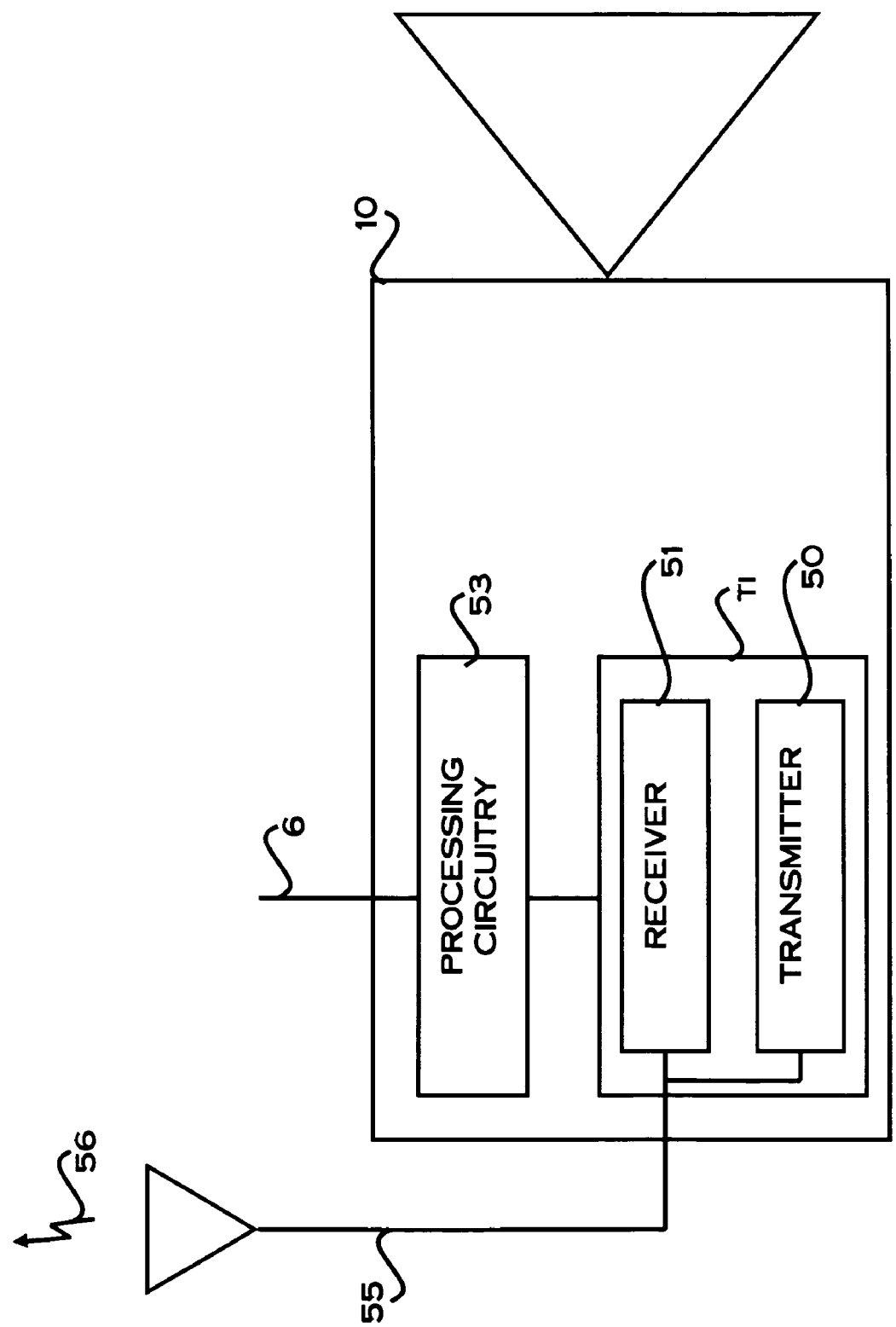
FIG. 2 illustrates a schematic of the transceiver and processing circuitry integrated in one of the cameras of the system of FIG. 1 according to one embodiment.

Reference will now be made to FIG. 2, which illustrates a schematic of the circuitry integrated in camera 10, of FIG. 1 for the purpose of explaining in more detail the circuitry integrated in each of the cameras 10-17. Both transceiver T1, which includes an RFID transmitter 50 and RFID receiver 51, and processing circuitry 53 are integrated in camera 10. The transceiver T1 is a virtual or digital RF type transceiver, such as a Wi-Fi or ZigBee radio, which transmits and receives RFID signals. One example of such an RF transceiver is Texas Instruments CC2420 radio. Alternatively, low cost digital radio transceivers can be used as can digital transceivers other than RF transceivers, such as infra-red transceivers or transceivers of other types of electromagnetic identifying signals.

The RFID transmitter 50 of the transceiver is arranged to encode an RF signal with an RFID tag identifier identifying the particular camera 10 in which the transceiver T1 is located to thereby form the RF identifying signal 56. RFID transmitter 50 is operable to transmit the RFID signal 56 at a predetermined power level from the camera 10, via an antenna 55, to nearby cameras in the camera network. The transmitter 50 can be configured to transmit the RFID signal intermittently, continuously or in response to a signal from the controller 3.

RFID receiver 51 is arranged to detect, also via antenna 55, RFID signals transmitted from other nearby cameras and to determine the identity of each particular nearby transmitting camera by reading the RFID tags encoded in the respective transmitted signals. Transceiver T1 includes sensor circuitry to measure the received signal strength (RSS) of each detected RFID signal. Processing circuitry 53 in the form of a microcomputer is coupled to the transceiver T1 to control turning the transceiver on to transmit the unique identifying signal or to receive RF identifying signals from another camera. Such processing circuitry may be integrated in the transceiver module itself.

Transceivers, antennas, and processing circuitry similar to those of camera 10, are also integrated in each of the other cameras 11-17 of the system 1. In alternative embodiments, the transceiver and/or processing circuitry and can be housed in a separate module which is attached to the camera or located proximate the location of the camera.

Figure 3:
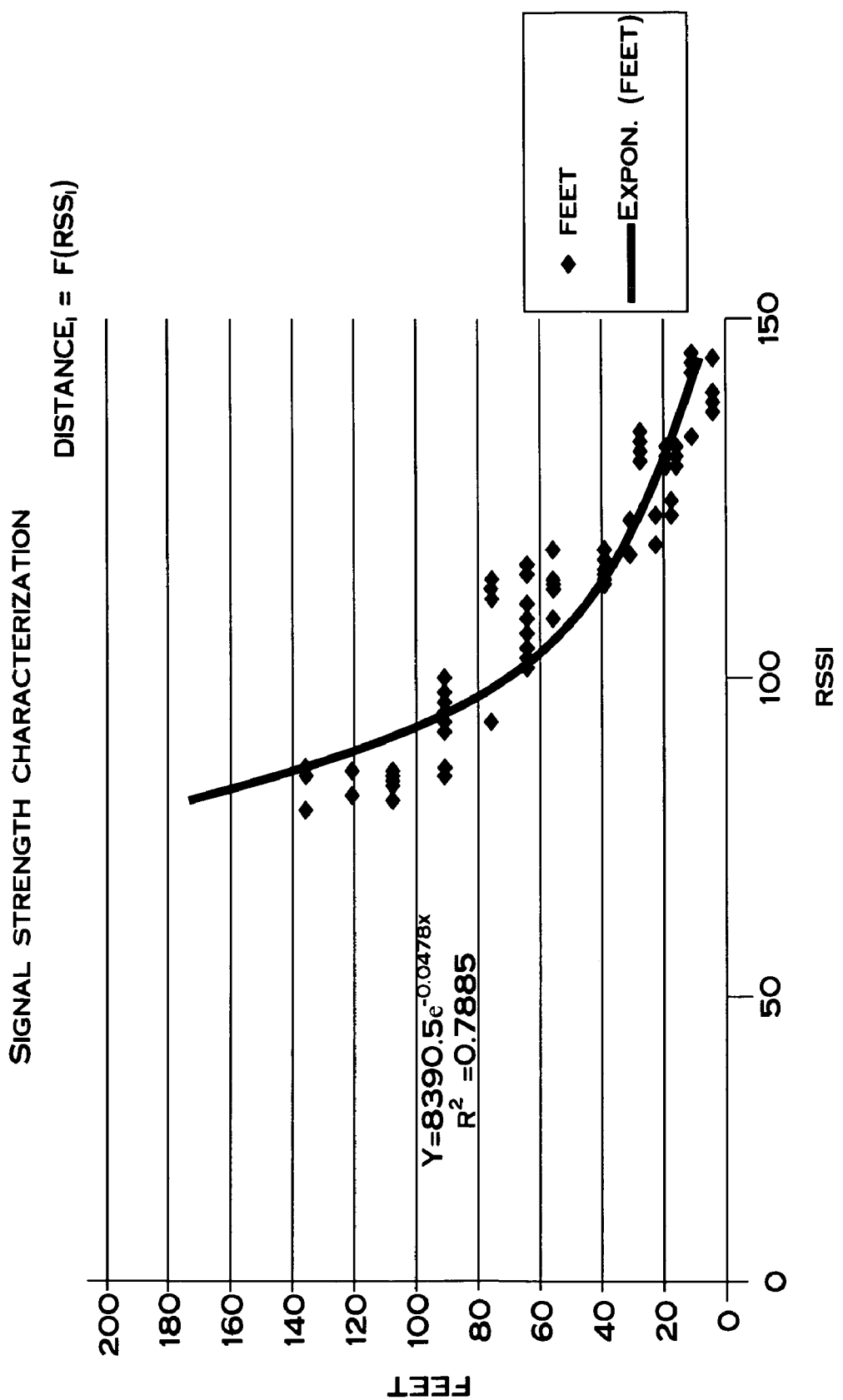
FIG. 3 depicts an exemplary data plot of rough radio signal strength versus distance.

As illustrated graphically in FIG. 3, which depicts an exemplary data plot of rough radio signal strength versus distance, an RF signal strength distance characterization reveals the strength of an RF signal degrades at a known rate over distance. The strength of the detected RF signal can be used to roughly estimate the distance from the camera detecting the RF signal to the camera transmitting the RF signal. By transmitting the RF signal at a predetermined power level or signal strength, the distance of travel of the RF signal can be estimated based on the known degradation of the RF signal for the particular transmitted power level or signal strength. The distance can therefore be estimated by correlating the detected RF signal strength to predetermined signal strength-distance measurements as characterized experimentally for an RF signal transmitted with the predetermined power level or signal strength.

Referring now to the controller 3 FIG. 1, the controller is configured to be able to receive from each of the camera transceivers T1-T8 signals corresponding to the measured received signals strength (RSS) of the identifying signals together with associated camera identity data. Controller 3 is also configured to be able to receive and correlate the measured RSS values to the experimentally determined signal strength-distance data pre-stored in the controller for each particular RFID signal to thereby estimate the relative distances between nearby cameras.

Advantageously, incorporating the transceivers in the cameras and configuring the controller to be able to estimate the relative positions of each camera from each other camera based on the received signal strength (RSS) of the RFID signals enables the system to automatically determine the spatial positions of the cameras positioned at different locations.

In the illustrative embodiment of the system 1, the transmitter in each camera is configured to transmit an RF signal at the same predetermined power level. However, the transmitters can alternatively be configured to transmit the RF signals at different power levels in which case the processing circuitry and/or controller would be further configured to be able to correlate the identity of the transmitting camera, derived from the RFID signal, to particular experimental RF signal strength-distance data for the particular predetermined power level at which the RFID signal was sent.

Figure 4:
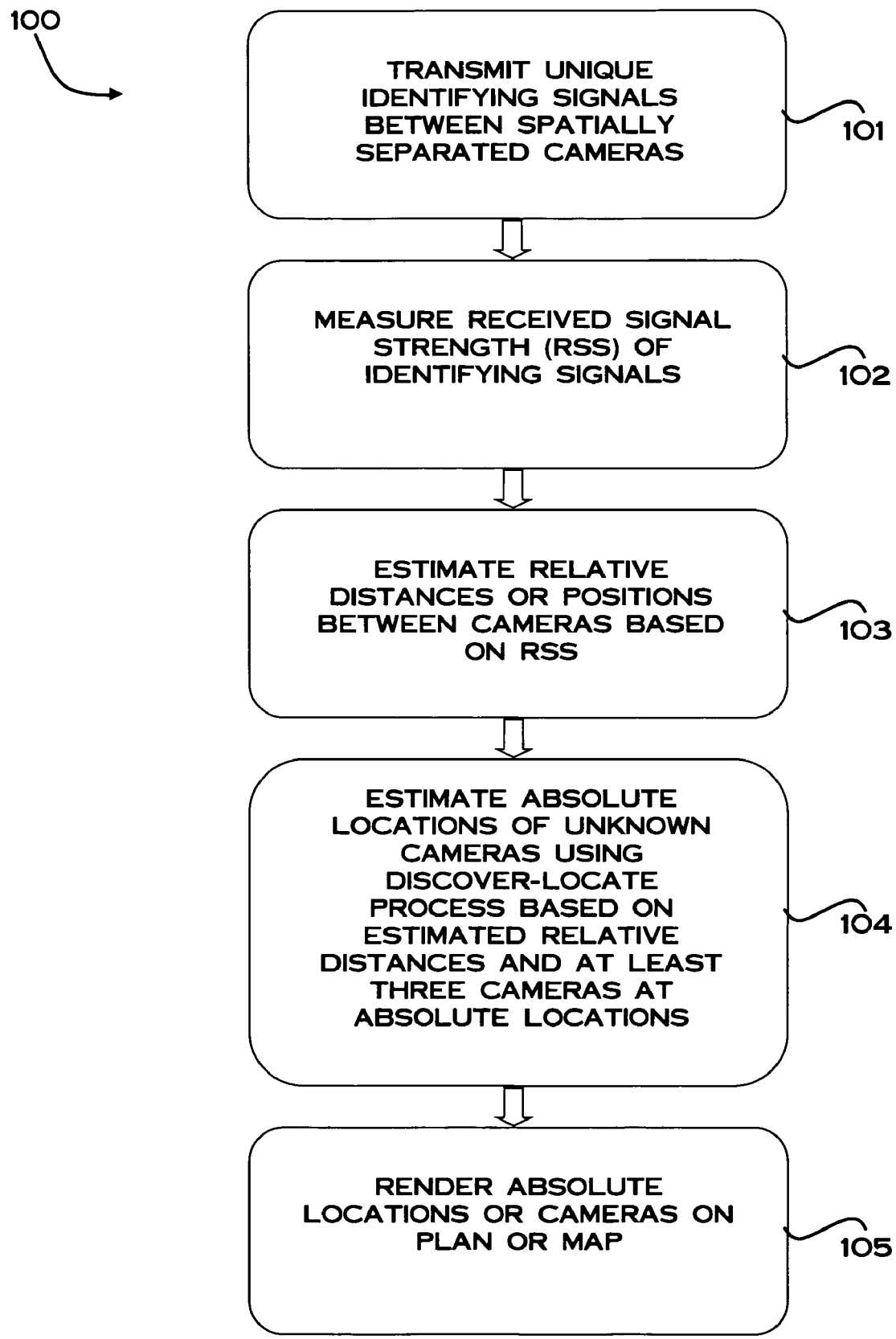
FIG. 4 illustrates a flow diagram outlining the general steps of a method for estimating the spatial positions of cameras in a camera network according to one embodiment.

A method for estimating the spatial positions of cameras in a camera network according to one embodiment will now be described referring to FIG. 4, which illustrates a flow diagram outlining the general steps of the method. Method 100 is initiated by transmitting unique identifying signals between spatially separated nearby cameras, as indicated in process step 101. Thereafter, the received signal strengths (RSS) of the identifying signals are measured, as indicated in process step 102. Then, the relative distances or positions between the cameras are estimated from the measured received signal strength (RSS) of the identifying signals to thereby determine the neighboring relationship among some or all of the cameras in the camera network (process step 103).

Thereafter, as indicated in process step 104, the absolute locations of the unknown cameras are estimated based on the estimated relative distances and the absolute known locations of at least three cameras using a discover-locate process which will be explained in more detail below. The absolute locations of the cameras are then annotated on a plan or map representing an environment in which camera network is installed (not shown) (process step 105). The estimated locations of the cameras can be annotated on the map either after all locations have been estimated or as each location is estimated.

Method 100 can be implemented in the system of FIG. 1 as follows. System 1 implements process step 101 by transceivers T1-T8 broadcasting their unique RFID identifying signals every few minutes between the spatially separated nearby cameras 10-17 or upon instruction to broadcast by the controller 3 in response to an update request. Transceivers T1-T8 also implement step 102 by measuring the RSS of the RFID signals received at respective cameras 10-17. System 1 implements process step 103 by the controller 3 estimating the relative distances or positions between the cameras from the measured RSS together with associated camera identity data forwarded to the controller 3 from relevant cameras. Alternatively, the relative distances or positions can be determined locally at respective cameras by the processing circuitry and then forwarded to the controller.

System 1 implements process step 104 by the controller 3 using the discover-locate process to estimate the absolute locations of the unknown cameras based on pre-stored data corresponding to absolute known locations of at least three cameras of the network and the previously estimated relative distances. System 1 implements process step 105 by the controller 3 annotating the estimated absolute locations of the cameras together the predetermined known locations of the at least three cameras on a map or plan rendered on display of the graphical user interface 4.

In order to more adequately explain the discover-locate process (process step 104 of FIG. 4), reference will now be made to FIG. 5, which is a flow diagram illustrating process step 104. As indicated in process step 151, initially, at least three cameras at known absolute locations are identified. Then, a search is made for an unknown camera in the vicinity of the at least three cameras at known locations based on the estimated relative distances of the cameras, as indicated in step 152. Assuming an unknown camera is discovered, the process continues through process step 153 to process step 154 in which the absolute location of the unknown camera is estimated from a geometric calculation using the predetermined absolute locations of the at least three cameras and the estimated relative distances between the unknown camera and the at least three cameras. Various geometric calculations, such as mulitilateration calculations, can be for estimating the camera location, as will be explained in more detail below.

Thereafter, as indicated in step 155, the previously discovered and located camera can be used as a camera at a known location for the purpose of estimating the absolute location of another camera in process steps 151 to 154. Assuming there is always at least 3 cameras at known locations, the steps 151 to 155 of the discover—locate process can be repeated again and again as a cascading process throughout the entire network to find and locate more and more nearby unknown cameras using previously located cameras until all unknown cameras are discovered and located. Once all the unknown cameras have been discovered and located, there are no further unknown cameras to be discovered and so the process terminates, as indicated in process steps 153 & 156.

Figure 5:
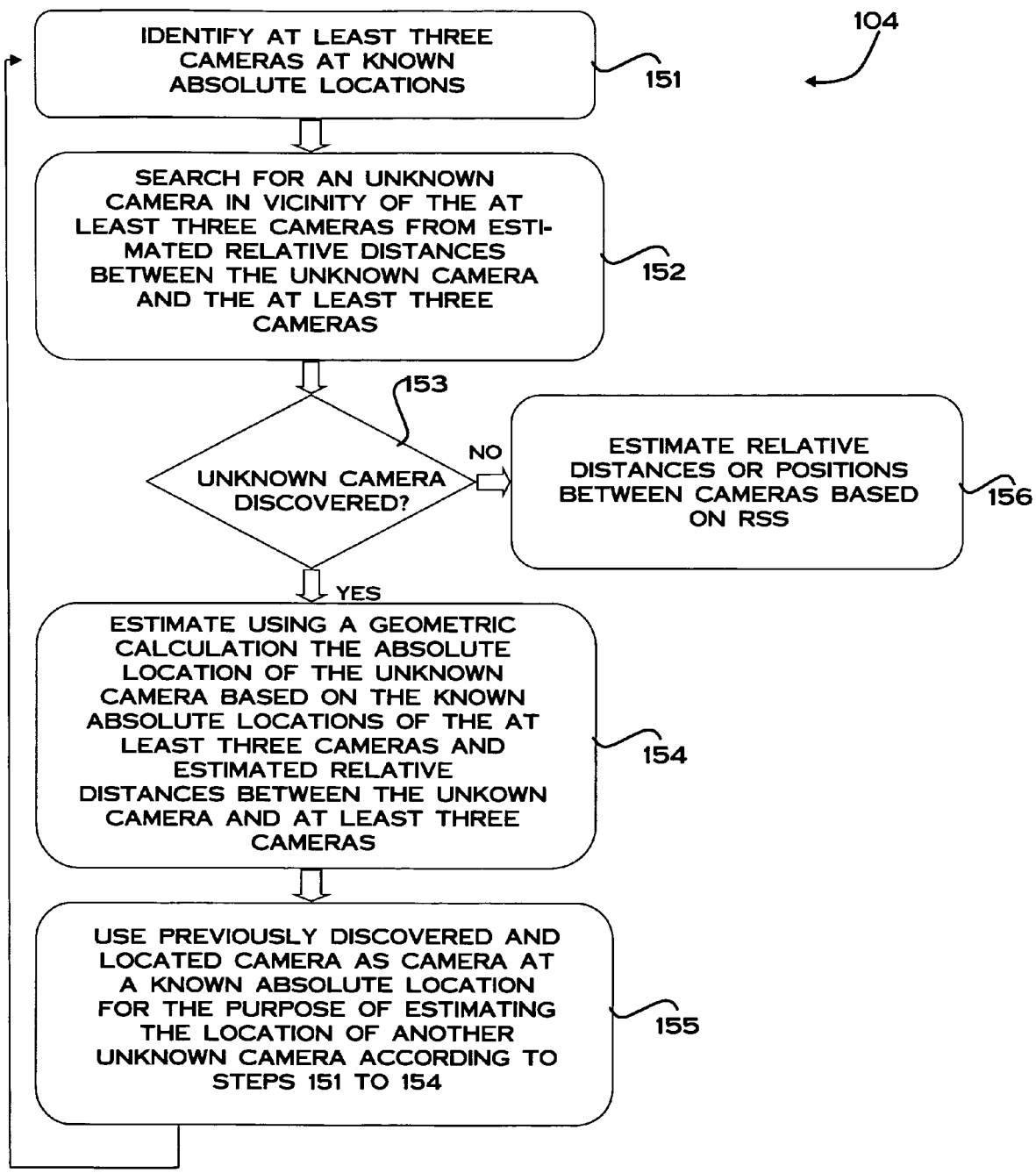
FIG. 5 illustrates in more detail the method step of estimating the absolute locations of unknown cameras referred to in FIG. 4.
Figure 6:
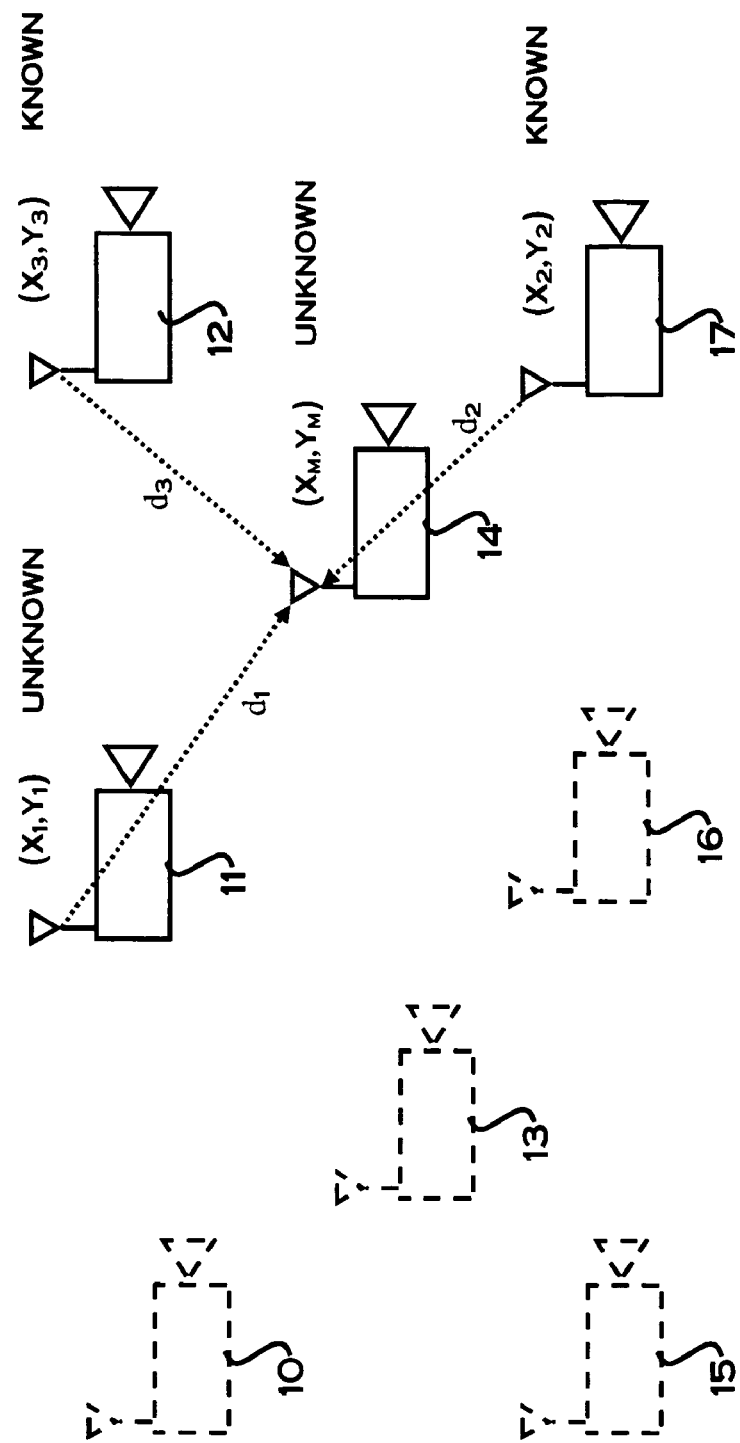
FIG. 6 illustrates an example of estimating the absolute location of an unknown camera of the system of FIG. 1 according to one embodiment.

In order to adequately explain the implementation of the discover-locate process step 104 in the system 1 of FIG. 1, let us assume by way of example that the controller 3 implements the first process step 151 of FIG. 5 by identifying from pre-stored camera location-identity data that cameras 11, 17 & 12 are located at absolute known locations having coordinates $(X_1, Y_1), (X_2, Y_2)$, and $(X_3, Y_3)$, as shown in the schematic of FIG. 6. Controller 3 then implements process step 152 by the controller 3 examining the previously estimated relative distances and camera identity data forwarded from the cameras and determines the relative distances between cameras 11, 12 & 17 and an unknown camera 14 to be $d_1$, $d_2$ and $d_3$, respectively, thereby finding or discovering the unknown camera 14 is in the vicinity of the cameras at the known locations having coordinates $(X_1, Y_1), (X_2, Y_2)$, and $(X_3, Y_3)$.

Since the controller 3 has discovered unknown camera 14, the system passes through step 153 and implements process step 154 by the controller 3 applying the parameters $(X_1, Y_1)$, $(X_2, Y_2), (X_3, Y_3)$ and $d_1$, $d_2$ and $d_3$ to a geometric calculation to estimate the unknown position coordinates $(X_m, Y_m)$ of the unknown camera 14.

Figure 8:
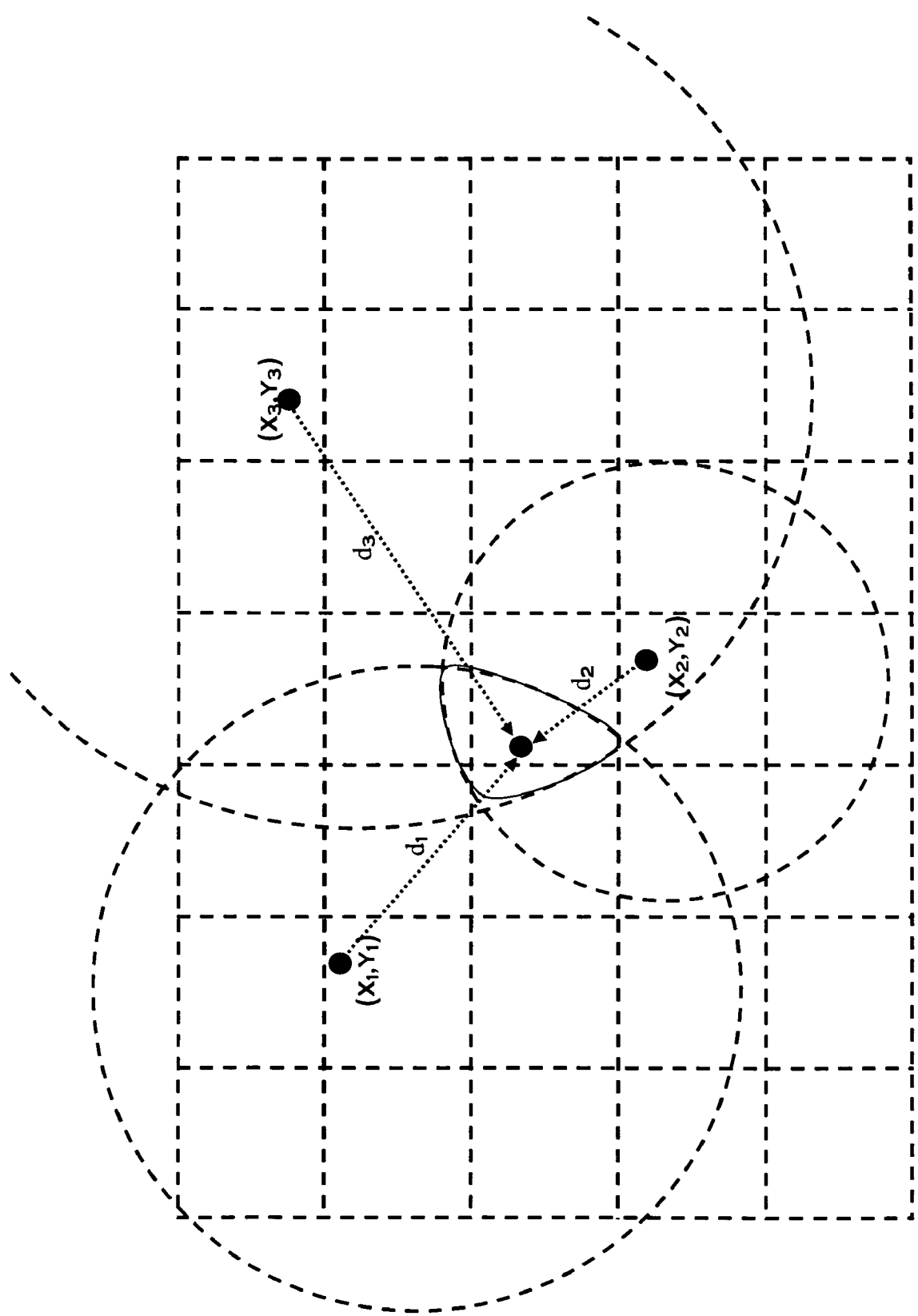
FIG. 8 illustrates an example of the accuracy of the absolute location estimation used in the example of FIG. 6.

The geometric calculation used to estimate the camera absolute location in the illustrative embodiment is multilateration calculation. The general multilateration expression for estimating the location of the unknown camera using three cameras at known absolute locations is as follows:

$$\sqrt{(X_1-X_m)^2+(Y_1-Y_m)^2}-d_1+ \\ \sqrt{(X_2-X_m)^2+(Y_2-Y_m)^2}-d_2+ \\ \sqrt{(X_3-X_m)^2+(Y_3-Y_m)^2}-d_3 \quad \text{Ex. 1}$$

where:

$X_m$ and $Y_m$ are the Euclidian position coordinates of the unknown camera, $d_1, d_2, d_3$ are distances between the unknown camera and the respective three nearby cameras, and $(X_1, Y_1), (X_2, Y_2), (X_3, Y_3)$ are the known Euclidian position coordinates of the respective three nearby cameras The camera coordinates $X_m$ and $Y_m$ are determined by the controller 3 solving the multiateration expression 1 to find the value of $X_m$ and $Y_m$ with a minimum error value as indicated in FIG. 8 in which the shaded area is the area of "maximum likelihood" that contains values for $X_m$ and $Y_m$ where the multilateration expression reaches it's minimum value.

As indicated in FIG. 8, the accuracy of the location measurement increases with increasing number of cameras at known locations so that the accuracy of the discover-locate process step 104 increases using an increasing number of cameras at known locations. The general expression is:

$$\min_{x_B, y_B} \sum_{i=1}^{n} w_i J_i^2 \quad \text{Ex. 2}$$

where: $J_i = \sqrt{(X_i - X_B)^2 + (Y_i - Y_B)^2} - d_i$ and
- i=an index identifying a particular one of known locations;
- $X_B$, $Y_B$=the estimated Euclidian coordinates of unknown camera;
- $X_i$, $Y_i$=the estimated Euclidean coordinates of known location i;
- $d_i$=the distance estimate corresponding to known location i;
- $w_i$=a weighting factor; and
- n=the number of said known locations.

Determining distances between the unknown camera and three or more detecting cameras at known locations is preferred so that a better estimate of the position of the unknown camera can be obtained using expression 2. Additional techniques can be employed further to improve the accuracy of the position measurement such as error minimization, error probability, anchor weighting by expected error, use of multiple transmit power levels and heuristics on maximum anticipated movement.

Figure 7:
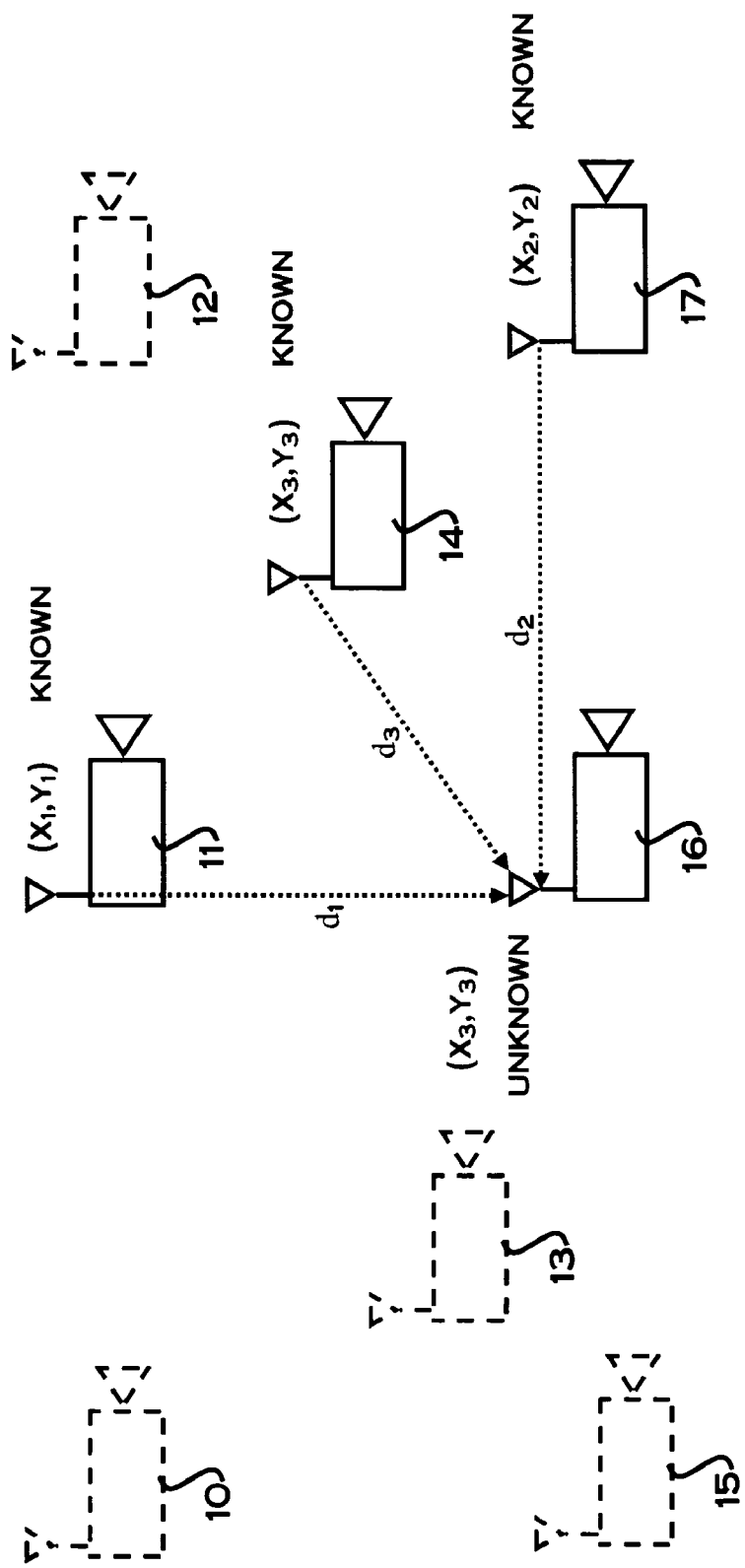
FIG. 7 illustrates an example of estimating the absolute location of another unknown camera of the system of FIG. 1 according to one embodiment.

Thus following on from the implementation of process step 154 in the system 1 of FIG. 1, the system implements process step 155 by the controller 3 storing the estimated location $(X_m, Y_m)$ of camera 14 as a known location of camera 14 and repeating steps 151 to 154 using located camera 14 for the purpose of discovering and estimating the absolute location of a next camera in vicinity of camera 14. Thus, the system repeats 151 & 152 by the controller 3 searching and discovering another unknown camera 16 in the vicinity of cameras 11 & 17 and previously located camera 14, as indicated in FIG. 7. The system then implements step 154 again by the controller 3 utilizing the known coordinates $(X_1, Y_1)$, $(X_2, Y_2)$, of respective cameras 11 & 17 and the previously estimated coordinates of cameras 13 (now $(X_1, Y_1)$) together with the determined relative distances d1, d2 and d3 between these cameras and the unknown 16 camera in the geometric calculation of expression. 1 to thereby estimate the absolute position coordinates $(X_m, Y_m)$ of the unknown camera 16.

Process steps 151-155 can be repeated again and again in a cascading manner throughout the rest of the camera network to discover and locate the other remaining unknown cameras 10, 13, 15 in the camera network of FIG. 1. The discover-locate process 104 is then terminated by the controller 3.

By estimating the locations of the unknown cameras using this cascading discover-locate process, the location of all unknown cameras can be estimated from a small number of cameras in known locations so that the camera network can be automatically configured and installed with minimum installation information. The camera network can therefore be quickly and easily installed without having to manually measure the position of all the cameras and/or input all the spatial positions of the cameras into the camera system.

Advantageously, the discover-locate process step 104 can also be used after installation to automatically estimate the location of lost cameras which are capable of transmitting and/or receiving identifying signals saving time and maintenance costs.

Furthermore, the controller 3 can easily determine which camera is in close proximity to an event of interest from the known locations of the cameras and the predetermined locations of the sensors 19-21 which locations are available to the controller. For example, in the example of FIG. 1, if sensor 19 detects an event in its vicinity, the controller 3 can compare the predetermined location of the sensor 19 with the estimated locations of all the cameras 10-17 and determine that cameras 10, 13 & 15 are in the physical vicinity of the event detected by sensor 19. The controller can indicate on the facility map the cameras which are in close proximity with the event by, for example, highlighting the particular cameras and event on the map.

In an alternative embodiment of the method for estimating the spatial positions of cameras in a camera network, the absolute location of a lost camera can be determined by transmitting identifying signals from cameras at known locations nearby the lost camera or from the lost camera to the nearby cameras at known locations. The absolute location of the lost camera can then be determined using the process 100. This method may be implemented in the system of FIG. 1 by the controller 3 requesting all the other cameras in the area of the lost camera to broadcast their identifying signals and/or requesting the lost camera to broadcast its identifying signal. If a transmitting identifying signal from a lost camera is picked up by at least three cameras at known locations, the absolute location of the lost camera can be determined using process 100 without necessarily transmitting identifying signals between other cameras.

The methods of the illustrative embodiments may be implemented using systems which estimate the relative distances between cameras from signal transmission characteristics other than received signal strength. For example, in alternative embodiments, the transceivers, processing circuitry and controller of the system of FIG. 1 can be adapted to enable relative distances to be estimated from the of time of arrival (TOA) or time difference of arrival (TDOA) of the identifying signals to estimate relative distances.

In a TOA measurement system, the transceivers would be adapted to substantially continuously broadcast a time signal from one of the plurality of cameras to each other of the plurality of cameras and measure the arrival delay of the detected identifying signal relative to the time signal. Alternatively, the transceivers can be configured to re-transmit the detected identifying signal back to the camera transmitting the identifying signal where the delay of transmitting the identifying signal round-trip between the cameras is measured.

The method for estimating the absolute locations of the cameras using TOA or TDOA measurements are similar to method 100 of the illustrative embodiment but for method step 103 which be modified to estimate the relative distances or positions between cameras based on TOA or TDOA, respectively, rather than RSS.

Other variations and modifications of the present invention will be apparent to those of skill in the art, and it is the intent of the appended claims that such variations and modifications be covered.

For example, the camera network can have any number of a plurality of cameras and is not limited to the number of cameras in the system of the illustrative embodiment of FIG. 1. Furthermore, the method for estimating the spatial positions of cameras in a camera network can be implemented in camera networks without the need for sensors 19-21 illustrated in system 1 of FIG. 1. Furthermore, ultrasonic signals or other non-electromagnetic signals may be employed for estimating the relative distances between cameras instead of electromagnetic signals.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A method for automatically estimating the spatial positions between cameras in a camera network, the method comprising transmitting unique identifying signals between a plurality of spatially separated nearby cameras; wherein said identifying signals comprise identifying signals selected from the group consisting of electromagnetic identifying signals, RF identifying signals, infra-red identifying signals and ultrasonic identifying signals; measuring the received signal strength (RSS), time of arrival (TOA), or time difference of arrival (TDOA) of said identifying signals; and estimating the relative distances or positions between at least some cameras from said received signal strength (RSS), time of arrival (TOA), or time difference of arrival (TDOA) measurements to thereby determine the neighboring relationship among said at least some cameras.

2. The method of claim 1, further comprising estimating the absolute location of at least one unknown camera from estimations of said relative distances between said at least one unknown camera and at least three cameras at known absolute locations and the known absolute locations thereof using a geometry based calculation.

3. The method of claim 1, further comprising estimating the absolute location of a plurality of unknowns camera using a discover-locate process comprising
  discovering at least one unknown camera of said plurality of unknown cameras in the vicinity of at least three cameras at absolute known locations based on the estimated relative distances between said unknown camera and said at least three cameras; and
  estimating the absolute location of said discovered at least one unknown camera from estimations of said relative distances between said at least one unknown camera and said at least three cameras and the known locations thereof using a geometry based calculation; and
  estimating the absolute location of said plurality of unknown cameras throughout the network by cascading said discover-locate process throughout the camera network;
  wherein cascading said discover-locate process comprises repeating both said steps of discovering at least one unknown camera and estimating the absolute location thereof using at least one previously discovered and located camera as a camera at a known location for the purpose of discovering and locating at least one other unknown camera until all cameras at unknown locations throughout said camera network are discovered and the absolute locations thereof have been estimated.

4. The method of claim 3, further comprising annotating said absolute locations of said cameras on a plan or map of the environment in which said camera network is installed.

5. The method of claim 3, further comprising determining at least one camera in the proximity of an event of interest detected by a sensor by comparing the estimated absolute locations of said cameras to the predetermined absolute location of said sensor.

6. A method for automatically estimating the spatial positions between cameras in a camera network, the method comprising transmitting unique radio frequency identifying (RFID) signals between a plurality of spatially separated nearby cameras; measuring the received signal strength (RSS), time of arrival (TOA), or time difference of arrival (TDOA) of said RFID signals; and estimating the relative distances or positions between each camera and each other camera from said received signal strength (RSS), time of arrival (TOA), or time difference of arrival (TDOA) measurements to thereby determine the neighboring relationship among cameras in a camera network.

7. The method of claim 6, further comprising estimating the absolute location of a plurality of unknown cameras throughout the network using a cascading discover-locate process, said cascading discover-locate process comprising
  discovering at least one unknown camera in the vicinity of at least three cameras at absolute known locations based on the estimated relative distances between said unknown camera and said at least three cameras;
  estimating the absolute location of said discovered at least one unknown camera from estimations of said relative distances between said discovered at least one unknown camera and said at least three cameras and the known locations thereof using a geometry based calculation; and
  repeating said steps of discovering said at least one unknown camera and estimating the absolute location thereof using at least one previously discovered and located camera as a camera at a known absolute location for the purpose of discovering and locating at least one other unknown camera until all of said plurality of cameras at unknown locations are discovered and the absolute locations thereof have been estimated.

8. The method of claim 7, wherein said geometry based calculation comprises:
  a multilateration calculation comprising:

$$\sqrt{(X_1-X_m)^2+(Y_1-Y_m)^2}-d_1+ \\ \sqrt{(X_2-X_m)^2+(Y_2-Y_m)^2}-d_2+ \\ \sqrt{(X_3-X_m)^2+(Y_3-Y_m)^2}-d_3$$

where:
  $X_m$ and $Y_m$ are the Euclidian position coordinates of said unknown camera,
  $d_1, d_2, d_3$ are distances between the unknown camera and the respective three cameras at absolute known locations, and
  $(X_1, Y_1), (X_2, Y_2), (X_3, Y_3)$ are the known Euclidian position coordinates of the respective three nearby cameras
  wherein $X_m$ and $Y_m$ are determined where said multilateration calculation reaches a minimum value; and
  wherein said geometry based calculation further comprises $$\min_{x_B, y_b} \sum_{i=1}^{n} w_i J_i^2$$

where: $J_i = \sqrt{(X_i-X_B)^2+(Y_i-Y_B)^2}-d_i$
and
  i=an index identifying a particular one of known locations;
  $X_B, Y_B$=the estimated Euclidian coordinates of unknown camera;

$X_i, Y_i$ = the estimated Euclidean coordinates of known location i;

$d_i$ = the distance estimate corresponding to known location i;

$w_i$ = a weighting factor; and n = the number of said known locations.

9. The method of claim 7, further comprising annotating the discovered absolute location of said unknown cameras on a plan or map representing an environment in which said camera network is installed.

10. The method of claim 6, wherein said step of estimating said relative distances from the received signal strength measurements comprises: measuring the received signal strengths of said RFID signals; and correlating said measured signal strengths to predetermined strength-to-distance measurements for RFID signals transmitted at substantially the same signal strength as said RFID signals.

11. The method of claim 6, further comprising estimating the absolute location of at least one lost camera from estimations of said relative distances among at least one unknown camera and at least three cameras at known positions and the known locations of the least there cameras using a geometry based calculation.

12. A system for estimating the spatial positions of cameras in a camera network, the system comprising a plurality of spatially separated cameras carrying transceivers adapted and arranged to transmit unique identifying signals between nearby cameras; and a controller, operably linked to said transceivers, adapted and arranged to estimate the relative positions or distances between at least some cameras from the received signal strength (RSS), time of arrival (TOA), or time difference of arrival (TDOA) of RFID signals to thereby determine the neighboring relationship said at least some cameras.

13. The system of 12, wherein said controller is configured to discover said at least one unknown camera in the vicinity of at least three cameras at absolute known locations based on the estimated relative distances between said unknown camera and said at least three cameras; and wherein said controller is further configured to estimate the absolute location of said at least one unknown camera from estimations of said relative distances between said at least one unknown camera and said at least three cameras and the known locations thereof using a geometry based calculation; and wherein said controller is configured to repeatedly discover another at least one unknown camera and estimate the absolute location thereof using at least one previously discovered and located camera as a camera at a known location for the purpose of discovering and locating at least one another unknown camera until a plurality of all cameras at unknown locations are discovered and the absolute locations thereof have been estimated.

14. The method of claim 13, wherein said geometric calculation comprises a multilateration calculation.

15. The system of claim 14, further comprising a graphical user interface operably linked to said controller and wherein said controller is adapted and arranged to render said estimated locations of said cameras on a plan or map of an environment displayed on said graphical user interface.

16. The system of claim 14, wherein said controller is adapted and arranged to identify at least one camera in the proximity of an event of interest detected by a sensor by comparing the absolute locations of said cameras to a predetermined absolute location of said sensor.

* * * * *